United States Patent Office 3,534,091
Patented Oct. 13, 1970

3,534,091
RECOVERY OF WATER-SOLUBLE ACIDS
Heinz Hartel, Oberlar, and Gerhard Bier, Troisdorf, Germany, assignors to Dynamit Nobel Aktiengesellschaft, Troisdorf, Germany, a corporation of Germany
No Drawing. Filed Sept. 7, 1966, Ser. No. 577,607
Claims priority, application Germany, Sept. 9, 1965, D 48,165
Int. Cl. C07c 57/04
U.S. Cl. 260—526
6 Claims

ABSTRACT OF THE DISCLOSURE

Improvement in separating lower carboxylic acids by extraction thereof from an aqueous solution by using as the extractant a fatty acid having about 6 to 22 carbon atoms therein which is liquid at the temperature of extraction.

---

This invention relates to the recovery of carboxylic acids. It more particularly refers to the recovery of carboxylic acids from water solution thereof.

Carboxylic acids are often produced by oxidation reactions. In production of carboxylic acids, as well as in the use thereof, it often happens that these acids become dissolved in water. This is particularly so since carboxylic acids, particularly lower carboxylic acids, are quite soluble in water.

It will be apparent that the most straightforward separation of aqueous solutions of lower carboxylic acids would be to distill whereby one component, the acid or the water is taken overhead as a distillate and the other component, the higher boiling of the two, is taken as a bottoms or raffinate stream in the case of a continuous distillation or remains in the pot when batch operation is employed.

It is unfortunate that not all of the aqueous solutions of lower carboxylic acids are amenable to separation by distillation. However, it happens that in some cases distillation is either technically or economically inadvisable. For example there are some lower carboxylic acids which boil fairly close to water at atmospheric pressure. In these cases it is required that reduced or elevated pressure stills be used and, in the case of continuous operation, that fractional distillation columns have a large number of actual or theoretical plates. In some cases, it may even be necessary to use so-called superfractionation techniques.

In another area, it has been found to be uneconomical to use distillation as the resolution vehicle for aqueous solutions of carboxylic acids. In the case of resolution of aqueous solutions of unsaturated acids, particularly lower aliphatic unsaturated carboxylic acids, the energy input required for distillation and the elevated temperatures thereof have a tendency to induce at least oligomerization and in many cases polymerization of the unsaturated moiety with attendant loss of the valuable desired product.

It has therefore been attempted to recover lower unsaturated carboxylic acids by techniques other than distillation. In the main, these techniques have utilized selective extraction to separate the acid from the water and then relatively mild distillation to separate the acid from the extractant. The extractants used have included various hydrocarbons, esters, ketones, halogenated hydrocarbons or alcohols. It would be most desirable to provide an extractant in which the desired carboxylic acid has a great solubility but which is substantially immiscible with water. If such could be provided, a relatively small amount of extractant would efficiently remove a large amount of acid from its aqueous solution with little water contamination. However, lower unsaturated carboxylic acids such as acrylic acid and methacrylic acid are also poorly soluble in completely water-insoluble extractants of this type, for instance in aliphatic or aromatic hydrocarbons, so that the extractant needed is disproportionately high, particularly when dilute aqueous solutions of the unsaturated carboxylic acids are to be subjected to extraction. When using ethers (diethylether, diisopropylether, etc.), additional difficulties occur due to the fact that ether peroxides are often present which can lead to the polymerization of the unsaturated carboxylic acids even during the course of the extraction process. Better results are obtained upon the extraction of acrylic acid or methacrylic acid with esters, for instance methyl acetate, ethyl acetate, n-propyl acetate, isopropyl acetate or the corresponding esters of other low molecular carboxylic acids or dicarboxylic acids, such as diethyl maleate, and ketones, for instance methyl ethyl ketone, diethyl ketone, methyl-n-propyl-ketone, methyl-isopropyl-ketone, methyl-isobutyl-ketone and the like, or alcohols such as n-butanol, isobutanol, sec. butanol, tert. amyl alcohol, n-octanol, 2-ethylhexanol or high boiling alcohols. In all of these cases, however, the solubility of these extractants in water leads to losses of material, which losses are particularly disturbing when dilute aqueous solutions of acrylic acid or methacrylic acid are extracted and the solutions containing still further substances which have been treated in this manner are to be recycled for reuse. Furthermore, in most of these cases, there is finally present an extractant/unsaturated carboxylic acid mixture, the extractant portion of which boils at a lower temperature than acrylic acid or methacrylic acid. Such a type of composition is, however, unfavorable if only because of the energy required in the subsequent distillations since disproportionately much higher quantities of extractant must be evaporated before the unsaturated carboxylic acids can be recovered from the residue. Furthermore, in such a separation the danger of polymerization is increased because of the unsaturated acid being recovered as a raffinate from the still pot so that considerable quantities of inhibitors must be used.

It is therefore an object of this invention to provide a novel process for the recovery of lower carboxylic acids from water solution thereof.

It is another object of this invention to provide a process of removing lower carboxylic acid values from dilute aqueous solutions thereof.

It is a further object of this invention to provide a novel process for the recovery of lower carboxylic unsaturated acid values from aqueous solutions thereof.

It is a still further object to provide a novel extraction process for recovery of acrylic and methacrylic acid values from aqueous solution thereof.

It is still another object to provide a novel class of extractants for removal of lower carboxylic acids from aqueous solution thereof.

Other and additional objects of this invention will become apparent from a consideration of this entire specification, including the claims appended hereto.

In accord with and fulfilling these objects, this invention includes, as one of its aspects, the separation of lower carboxylic acids from aqueous solution thereof by means of the use of $C_6$ to $C_{22}$ fatty acids. Examples of such extraction agents are caproic acid, lauric acid, palmitic acid, stearic acid or other aliphatic carboxylic acids, individually or in mixture, and furthermore, acid mixtures obtained upon the processing of fats such as, for instance, "free-run fatty acid" or "main-run fatty acid," or other natural or synthetic straight-chain or branched-chain carboxylic acids, for instance isooctanoic acid or isononanoic acid. The use of carboxylic acids which are still solid at room temperature can be facilitated by the use of higher temperature—up to 100° C.—in the extraction or by the use of preferably eutectic carboxylic acid mixtures.

The separating of the mixture of, for instance, acrylic acid or methacrylic acid with the other carboxylic acids which is produced upon the extraction is effected by distillation, particularly at reduced pressure. In this connection acrylic or methacrylic acid is the fraction which passes over first whereupon the distillation is broken off and the residue can be used immediately for extraction of new aqueous acrylic-acid or methacrylic-acid solutions.

This invention is illustrated by the following examples which are in no way to be construed as limiting on the scope of this invention.

EXAMPLE 1

Equal quantities of caproic acid and an aqueous acrylic acid solution containing 0.864 weight percent acrylic acid were shaken in two parallel batches at 20° C. and 75° C. in each case for 15 minutes and the layers thereupon separated. By titration it was found that at 20° C., 42.8% and at 75° C., 54.2% of the acrylic acid offered was taken up by the caproic-acid layer.

EXAMPLE 2

100 ml. of an aqueous methacrylic acid solution of a concentration of 0.946% by weight were stirred with 10 g. of lauric acid for 15 minutes at 75° C. By then titrating it was found that 32.2% of the methacrylic acid offered had been taken up by the lauric-acid layer.

EXAMPLE 3

The experiment of Example 2 was repeated with: (a) palmitic acid, (b) stearic acid, (c) the eutectic palmitic acid/stearic acid mixture.

In this connection, there were taken up by the carboxylic acid layers (in percent of the methacrylic acid offered): (a) 21.9%, (b) 21.6%, (c) 23.6%.

In a parallel test with aqueous acrylic acid of a concentration of 0.995% by weight, the corresponding percentages were only slightly less.

EXAMPLE 4

Example 2 was repeated in similar fashion with "first run fatty acid" at 75° C. In this case 37.7% of the methacrylic acid offered could be extracted.

EXAMPLE 5

270 ml. of aqueous acrylic acid solution of a concentration of 1.135% by weight were shaken with 30 g. of isooctanoic acid for 5 minutes at 20° C., the phases separated and the isooctanoic acid layer again shaken with 270 ml. of aqueous acrylic acid solution of a concentration of 1.135% by weight for 5 minutes at 20° C., then the phases separated again and titrated: In step 1, 27.2% and in step 2, 21.1% of the acrylic acid offered were extracted. There was obtained an approximately 5.68% solution of acrylic acid in isooctanoic acid.

EXAMPLE 6

The same procedure as in Example 5 was carried out with a 1.032% by weight aqueous methacrylic acid solution. The corresponding extraction values were: In step 1, 41.4% and in step 2, 15.0% of the methacrylic acid offered. There was obtained an approximately 5.8% solution of methacrylic acid in isooctanoic acid.

EXAMPLE 7

270 ml. of a 1.135% by weight aqueous acrylic acid solution were shaken with 30 g. of isononanoic acid for 5 minutes at 20° C., whereupon the two layers were separated. There was obtained a 4.37% solution of acrylic acid in isononanoic acid.

EXAMPLE 8

200 ml. of a 1.029% by weight aqueous methacrylic acid solution were shaken with 20 g. of isononanoic acid for 5 minutes at 20° C. After separation of the layers the isononanoic acid layer was again shaken for 5 minutes with a methacrylic acid solution (as above). From the two successive extraction steps there was obtained a 6.07% solution of methacrylic acid in isononanoic acid.

EXAMPLE 9

100 g. of a mixture of 5% by weight acrylic acid and 95% by weight isooctanoic acid were distilled in an annular slot column at 23 mm. Hg. With total reflux upon heating from 58° C. to 114° C. the acrylic acid was drawn practically quantitatively within a few minutes into the interposed cooling trap. The distillation mixture was inhibited with hydroquinone.

EXAMPLE 10

100 g. of a mixture of 5% by weight methacrylic acid and 95% by weight of isooctanoic acid were separated in a manner similar to Example 9. With total reflux and 24 mm. Hg., 68% passed into the interposed cooling trap while upon the subsequent distillation up to a temperature of 75° C. practically the entire balance of the methacrylic acid passed into the trap. The distillation mixture was inhibited with hydroquinone.

EXAMPLE 11

1000 ml. of an initial solution containing 330 g. of NaCl, 10 g. of NaOH, balance water, were mixed in the reaction zone with 14 g. of gaseous acrolein, conducted over $CuO/Ag_2O$ on asbestos (prepared by precipitating 181.5 g. of $Cu(NO_3)_2 \cdot 3H_2O/2.55$ g. $AgNo_3$ on asbestos core) and the solution then acidified with HCl.

The solution was extracted with 100 ml. of isooctanoic acid and the resultant acid solution heated for 5 to 10 minutes under a vacuum of 23 mm. Hg. to 100° C. The dissolved acrylic acid collected practically quantitatively in an interposed cooling trap. The extraction yield of monomeric acid with a single extraction of the aqueous acrylic acid solution containing the neutral salt with 10% of the volume of isooctanoic acid was about 75% and in case of a double extraction approximately 90%.

EXAMPLE 12

10 g. of lauric acid were heated with 100 ml. of 0.98% by weight aqueous crotonic acid for 15 minutes at 75° C. with vigorous stirring and titrated after the separation. 22.5% of the crotonic acid offered had been taken up by the lauric acid layer.

EXAMPLE 13

Similar procedure to Example 12 but with the use of stearic acid; it was found by titration that 15.7% of the crotonic acid could be eliminated.

The same result was observed when operating with palmitic acid.

What is claimed is:

1. In the process of separating $C_3$ and $C_4$ mono and unsaturated mono carboxylic acids from aqueous solution thereof by extraction; the improvement which comprises using as the extractant a fatty carboxylic acid having about 6 to 22 carbon atoms therein which is liquid at the temperature of extraction.

2. The improved process claimed in claim 1, wherein the extractant is a mixture of fatty acids.

3. The improved process claimed in claim 1, wherein said fatty acid is at least one selected from the group consisting of caproic acid, palmitic acid, lauric acid, stearic acid, isooctanoic acid and isononanoic acid.

4. The improved process claimed in claim 1, wherein said lower carboxylic acid is selected from the group consisting of acrylic acid, methacrylic acid and the acid oxidation product of acrolein.

5. The improved process claimed in claim 1, wherein said fatty acid has a melting point up to about 100° C.

6. The improved process claimed in claim, 1, wherein said extraction is carried out at about 20 to 75° C.

References Cited

UNITED STATES PATENTS 3,337,740  8/1967  Gray et al. _____ 260—526
3,344,178  9/1967  Brown et al. _____ 260—526

OTHER REFERENCES

Cram et al.: "Organic Chemistry," McGraw-Hill, New York, 1964, p. 185.

Morrison et al. "Organic Chemistry," Allyn-Bacon, Boston, 1959, P. 21.

LORRAINE A. WEINBERGER, Primary Examiner

D. STENZEL, Assistant Examiner